(12) United States Patent
Dupraz et al.

(10) Patent No.: US 8,994,483 B2
(45) Date of Patent: Mar. 31, 2015

(54) ELECTROMAGNETIC ACTUATOR COMPRISING PERMANENT MAGNETS AND MECHANICAL LOAD INTERRUPTER ACTUATED BY SUCH AN ACTUATOR

(71) Applicant: Alstom Technology Ltd., Baden (CH)

(72) Inventors: Jean-Pierre Dupraz, Bressolles (FR); Wolfgang Grieshaber, Lyons (FR); Michel Collet, Lyons (FR)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 14/368,272

(22) PCT Filed: Dec. 20, 2012

(86) PCT No.: PCT/EP2012/076412
§ 371 (c)(1),
(2) Date: Jun. 23, 2014

(87) PCT Pub. No.: WO2013/092878
PCT Pub. Date: Jun. 27, 2013

(65) Prior Publication Data
US 2014/0340182 A1      Nov. 20, 2014

(30) Foreign Application Priority Data

Dec. 23, 2011    (FR) .................... 11 62415

(51) Int. Cl.
*H01F 7/00*      (2006.01)
*H02K 33/00*     (2006.01)
*H01H 33/666*    (2006.01)
*H01H 3/26*      (2006.01)
(Continued)

(52) U.S. Cl.
CPC ............. *H02K 33/00* (2013.01); *H01H 3/222* (2013.01); *H01H 33/596* (2013.01); *H01H 33/6662* (2013.01); *H01H 51/2263* (2013.01); *H01H 3/26* (2013.01)
USPC ...................................................... 335/229

(58) Field of Classification Search
USPC ...................................................... 335/229
See application file for complete search history.

(56) References Cited

U.S. PATENT DOCUMENTS 3,750,151 A * 7/1973 Dill .............................. 340/319
5,293,144 A * 3/1994 Krimmer ...................... 335/272
(Continued)

FOREIGN PATENT DOCUMENTS

DE      19901120      7/2000
EP      0996135       4/2000
(Continued)

OTHER PUBLICATIONS

French Search Report from French Patent Application No. 11 62415 mailed Aug. 21, 2012.
(Continued)

*Primary Examiner* — Shawki S Ismail
*Assistant Examiner* — Lisa Homza
(74) *Attorney, Agent, or Firm* — Nixon Peabody LLP

(57) ABSTRACT

The invention relates to a novel permanent magnet electromagnetic actuator with triggering speed and drive torque improved relative to those of the prior art. The main target application is actuating an electromechanical switch-disconnector specifically for performing the operations to disconnect a mechatronic circuit-breaker for breaking high-voltage direct currents.

25 Claims, 10 Drawing Sheets

(51) Int. Cl.
*H01H 3/22* (2006.01)
*H01H 33/59* (2006.01)
*H01H 51/22* (2006.01)

(56) References Cited

U.S. PATENT DOCUMENTS

| | | | | |
|---|---|---|---|---|
| 5,502,424 | A * | 3/1996 | Kato et al. | 335/284 |
| 5,691,683 | A * | 11/1997 | Allwine, Jr. | 335/306 |
| 6,084,496 | A * | 7/2000 | Asano et al. | 335/284 |
| 6,507,257 | B2 * | 1/2003 | Mohler | 335/220 |
| 6,859,120 | B2 * | 2/2005 | Sweatt et al. | 335/78 |
| 8,510,933 | B2 * | 8/2013 | Murakami et al. | 29/607 |
| 2004/0140875 | A1 * | 7/2004 | Strom | 335/306 |
| 2006/0208591 | A1 | 9/2006 | Lee | |
| 2006/0255665 | A1 * | 11/2006 | Kraus et al. | 310/36 |
| 2006/0267421 | A1 * | 11/2006 | Aoshima | 310/49 R |
| 2007/0090908 | A1 * | 4/2007 | Kuwahara et al. | 335/306 |
| 2007/0216504 | A1 * | 9/2007 | Gonzalez et al. | 335/200 |
| 2007/0279168 | A1 * | 12/2007 | Osterberg | 335/272 |
| 2008/0055032 | A1 * | 3/2008 | Miyata | 335/306 |
| 2008/0129129 | A1 * | 6/2008 | Kori et al. | 310/58 |
| 2009/0051235 | A1 * | 2/2009 | Brown | 310/74 |
| 2009/0256451 | A1 * | 10/2009 | Braune et al. | 310/75 R |
| 2010/0026126 | A1 * | 2/2010 | Han et al. | 310/156.46 |
| 2010/0148593 | A1 * | 6/2010 | Ohashi et al. | 310/10 |
| 2010/0148894 | A1 * | 6/2010 | Ohashi et al. | 335/216 |
| 2010/0156199 | A1 * | 6/2010 | Peng et al. | 310/12.12 |
| 2010/0194508 | A1 * | 8/2010 | Hagiwara et al. | 335/302 |
| 2010/0289366 | A1 * | 11/2010 | Komuro et al. | 310/156.01 |
| 2011/0012440 | A1 * | 1/2011 | Toyota et al. | 310/12.24 |
| 2011/0025438 | A1 * | 2/2011 | Ohashi et al. | 335/216 |
| 2011/0037545 | A1 * | 2/2011 | Sivasubramaniam et al. | 335/216 |
| 2012/0067050 | A1 * | 3/2012 | Yamazaki | 60/721 |
| 2012/0139388 | A1 * | 6/2012 | Iwasaki et al. | 310/254.1 |
| 2013/0026870 | A1 * | 1/2013 | Baba et al. | 310/152 |
| 2013/0057374 | A1 * | 3/2013 | Adachi | 335/306 |
| 2014/0002220 | A1 * | 1/2014 | Johnson et al. | 335/302 |
| 2014/0055069 | A1 * | 2/2014 | Dai et al. | 318/494 |

FOREIGN PATENT DOCUMENTS

| | | |
|---|---|---|
| WO | WO9641411 | 12/1996 |
| WO | WO2013092873 | 6/2013 |

OTHER PUBLICATIONS

International Search Report from application PCT/EP2012/076412 mailed Mar. 21, 2013.

* cited by examiner

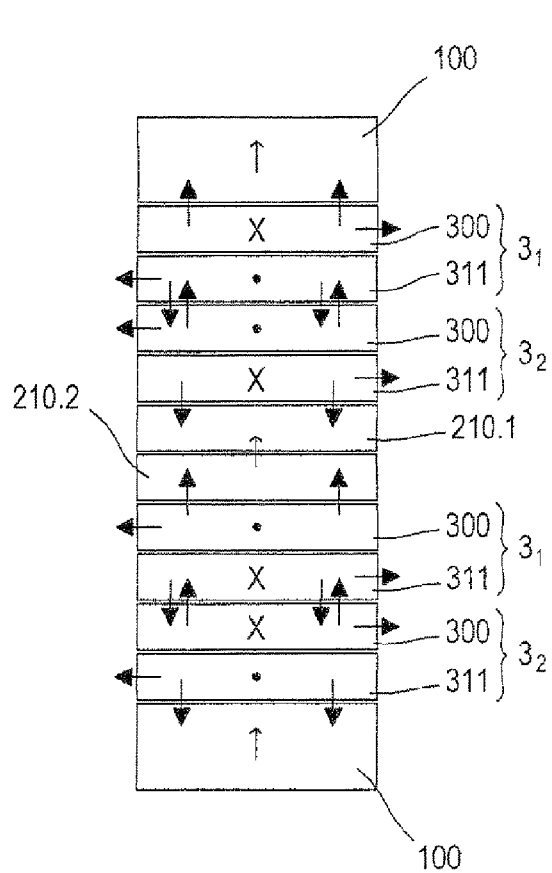
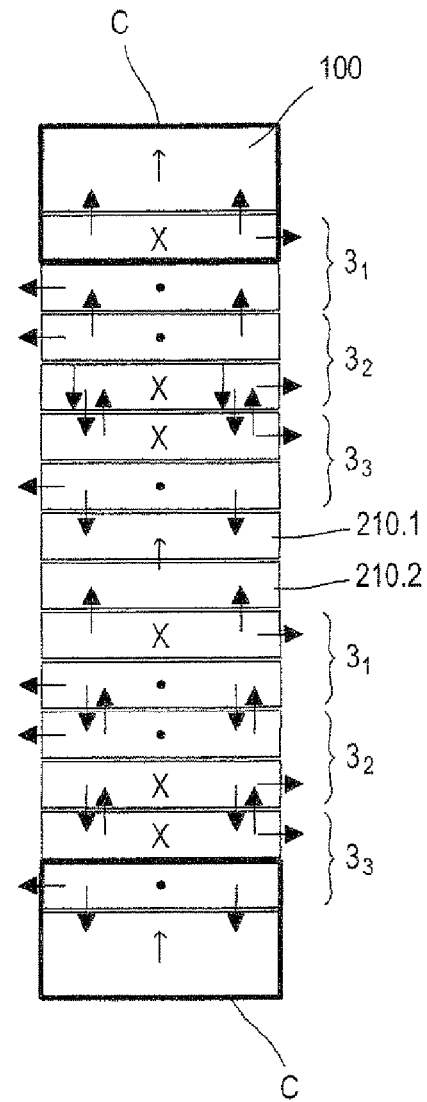
FIG. 4A
FIG. 4B

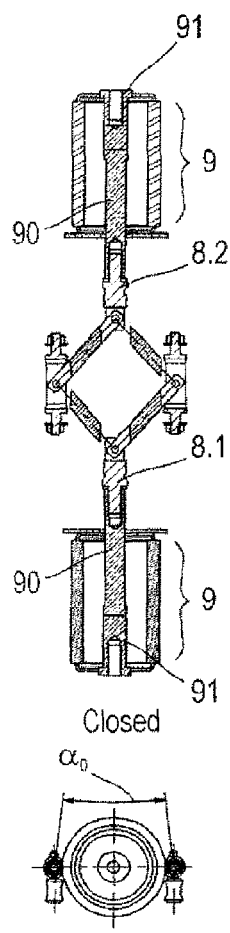
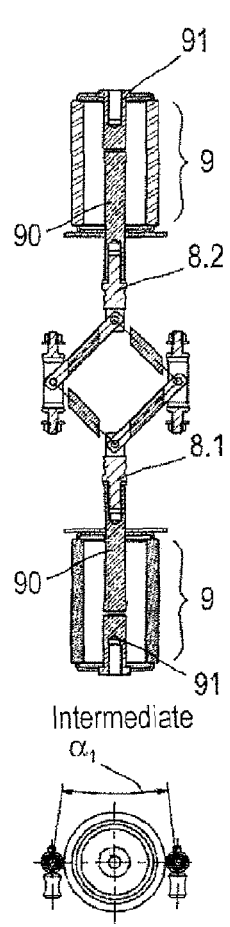
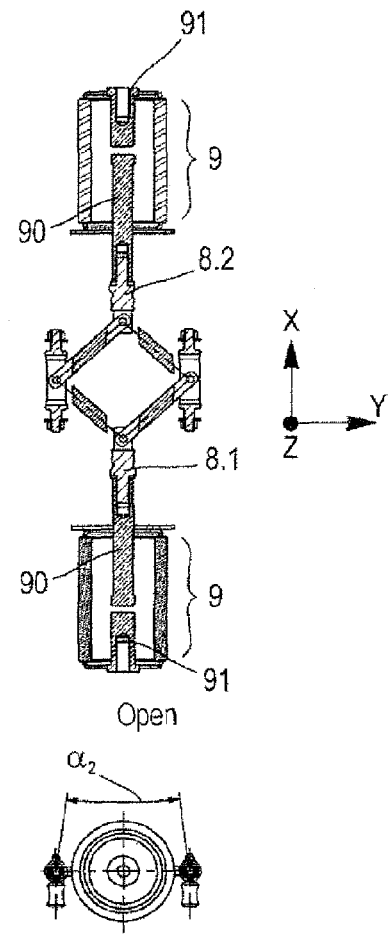
FIG. 10A   FIG. 10B   FIG. 10C
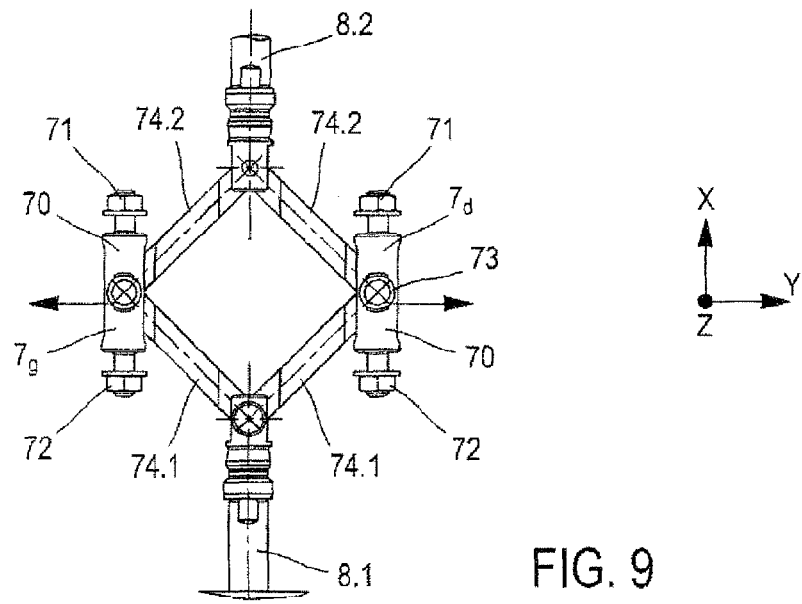
FIG. 9

ELECTROMAGNETIC ACTUATOR COMPRISING PERMANENT MAGNETS AND MECHANICAL LOAD INTERRUPTER ACTUATED BY SUCH AN ACTUATOR

CROSS REFERENCE TO RELATED APPLICATIONS

This application is the national stage of International Application No. PCT/EP2012/076412, filed Dec. 20, 2012, entitled, "Electromagnetic Actuator Comprising Permanent Magnets and Mechanical Load Interrupter Actuated by Such an Actuator," which claims the benefit of priority of French Patent Application No. 11 62415, filed Dec. 23, 2011, the contents of which are incorporated herein by reference in their entirety.

TECHNICAL FIELD

The invention relates to a permanent magnet electromagnetic actuator.

The invention relates more particularly to a solution for obtaining a permanent magnet actuator producing a very high torque in order to effect a small movement in a very short time.

The main target application is actuating a mechanical switch-disconnector, specifically for effecting mechanical disconnection operations in a mechatronic circuit-breaker as described and claimed in the patent application filed the same day as the present application, WO/2013/092873, published Jun. 27, 2013, and entitled "Dispositif disjoncteur mécatronique et procéde de déclenchement associé et application à la coupure de courant continu élevé" ["A mechatronic circuit-breaker device, an associated triggering method, and an application to breaking high direct currents"].

Note that a mechatronic device is a circuit-breaker that combines breaking by means of at least one semiconductor component and an electromechanical switch-disconnector.

Although described in relation to the main target application, the invention applies more generally to other applications such as applications in use at present in which the aim is to use a controlled pulsed current motor in which a very high torque is required to effect a small movement in a very short time.

The invention also relates to a switch-disconnector actuated by a permanent magnet electromagnetic actuator.

PRIOR ART

Permanent magnet electromagnetic actuators for actuating various mechanical devices are widely known.

In particular, it is already known to use them for opening and closing a circuit-breaker, in particular a vacuum interrupter for breaking medium-voltage currents. There may be mentioned by way of example patent application US2006/208591, which describes one such use.

As specified in the patent application in the name of the applicant referred to above and filed this day, the aim of the inventors has been to produce an actuator adapted to actuate an electromechanical switch-disconnector very quickly, i.e. in less than one millisecond. To be more precise, the aim has been to produce an actuator that, given the inertia resulting from the mass of the moving parts and antagonistic static forces produced for example by systems for locking a mechanical switch in an extreme open or closed position, meets the following specifications:

to develop a high drive torque, typically of the order of 2000 newton-meters (Nm), in response to the appearance of a drive current;
to produce this drive torque with an extremely short rise time, of the order of a few microseconds;
to have the lowest possible inertia;
to produce a relatively small movement, of the order of a few millimeters, of the mechanical switch-disconnector moving parts; and
to have the mechanical strength to withstand forces and shocks corresponding to intensive use of a hybrid circuit-breaker device as described and claimed in the above-mentioned patent application in the name of the applicant filed this day, typically corresponding to a number of the order of 10,000 opening and closing operations over its service life.

The inventors then considered a permanent magnet electromagnetic actuator and carried out an analysis of this type of actuator. The fundamental physical principle for producing an electromagnetic actuator of this type is to use Lorentz drive forces: an electrically-conductive material element immersed in a magnetic field is subjected, if an electrical current flows through it, to a drive force oriented in a direction perpendicular to the plane formed by the current and the magnetic field, this force being at a maximum if the respective directions of the magnetic field and the current are orthogonal. Under these circumstances, the conductor is generally referred to as the armature. The drive torque developed is then proportional to the current flowing in the armature and to the magnetic field in which it is immersed. If the magnetic field is generated by permanent magnets, its value is linked to the nature of the materials in which the permanent magnets are produced. Of known magnets, neodymium-iron-boron magnets generate the highest magnetic field value, typically up to 1.3 teslas (T). There is thus a natural limit on the value of the magnetic field generated by the permanent magnets. In other words, if the aim is greatly to increase the drive torque, the only option is to cause very high currents to flow in the armature. Ignoring thermal constraints, the value of the acceptable current for a motor is usually limited by the risk of demagnetization of the permanent magnets generating the magnetic field necessary to produce the Lorentz electromagnetic forces. It thus appears impossible with the given actuator geometries known at present to exceed a drive torque limit linked to this antagonism.

The aim of the invention is thus to propose a permanent magnet electromagnetic actuator with a higher drive torque than those known in the prior art.

A particular aim is to propose a permanent magnet electromagnetic actuator that is able to operate a mechanical switch-disconnector very quickly, i.e. within a time of less than one millisecond, and to meet the above specifications.

SUMMARY OF THE INVENTION

To this end, the invention provides an electromagnetic actuator of the permanent magnet type comprising:
a first stator part formed in a first substrate, at least part of which has rotational symmetry with at least one plane face forming a disk defining an axis of symmetry orthogonal to the disk, and comprising a first series of permanent magnets apparent on at least the disk of the first substrate and uniformly distributed over its surface with a constant angular pitch; each of the permanent magnets having a shape with at least one plane of symmetry orthogonal to its plane and parallel north and south poles parallel to the disk; the contact surfaces of the permanent magnets with the disk being inscribed between two concentric circles concentric with the disk; the plane of symmetry of each magnet being oriented along a radius of these concentric circles; two adjacent permanent magnets of the first series having opposite magnetization directions;

a second stator part formed in a second substrate, at least part of which has rotational symmetry with at least one plane face forming a disk defining an axis of symmetry orthogonal to the disk, and comprising a second series of permanent magnets apparent on at least the disk of the second substrate and uniformly distributed over its surface with a constant angular pitch; each of the permanent magnets having a shape with at least one plane of symmetry orthogonal to its plane and parallel north and south poles parallel to the disk; the contact surfaces of the permanent magnets with the disk being inscribed between two concentric circles concentric with the disk; the plane of symmetry of each magnet being oriented along a radius of these concentric circles; two adjacent permanent magnets of the second series having opposite magnetization directions; the second stator part being disposed parallel to the first stator part so that the axes of symmetry of their disks coincide and so that one pole of a magnet of the second series faces an opposite pole of a magnet of the first series so as to create intense magnetic fields in the airgap constituted in this way between the first and second stator parts;

at least one pair of superposed rotor parts in the airgaps between the first and second stator parts, each rotor part being formed from an electrically-insulative material substrate comprising at least one track of at least one electrically-conductive material layer disposed in a plane parallel to the plane of the substrate, the track comprising radial track portions called drive track portions, of unit width less than or equal to that of the permanent magnets in the radial direction and perpendicular to the direction of the thickness of the airgaps between the first and second stator parts, the drive track portions being regularly spaced with the same angular pitch as the first and second series of permanent magnets, the number of drive track portions being equal to the number of magnets of the first and second stator parts.

In the actuator of the invention:
two adjacent drive track portions in the same plane in the same rotor part are adapted to be supplied with currents flowing in opposite directions relative to the other;
two drive track portions respectively belonging to the first and second rotor parts of the same pair of rotor parts and superposed so as to be subjected to the magnetic field created by the same pair of magnets are also adapted to be simultaneously supplied with currents flowing in opposite directions so that when all the drive tracks are supplied with current the Lorentz drive forces generated by said currents in the magnetic fields created by the first and second series of permanent magnets, in the airgaps between the first and second stator parts, move one rotor part in the opposite direction to the other rotor part of the same pair along an axis perpendicular to the thickness of the airgaps.

Confronted with the problem of the intrinsic limitation of the magnetic field created by a permanent magnet, the inventors were then confronted by the antagonism referred to above, namely the need to discover how to propose an actuator rotor that may be supplied with very high currents without risk of demagnetizing the permanent magnets.

The basic idea of the invention was therefore to exploit the fact that as specified in the application referred to above, the rotor should not turn by more than a few degrees. The inventors then considered firstly maximizing the Lorentz drive forces by choosing radial currents and axial magnetic fields, i.e. fields perpendicular to the plane of the electrical conductors, and by maximizing the interaction lengths through an appropriate magnet and drive track geometry, and secondly physically superposing two rotors of identical design but supplied with currents in opposite directions so that the Lorentz forces created in the rotors would be in opposite directions and the rotors would turn in opposite directions. Because the rotors carry currents in opposite directions in the area of magnetomotive interaction, this solution would mean that the total current "seen" by the permanent magnets on either side in their respective stator parts would be zero to a first order. Thus the risk of demagnetizing the permanent magnets is pushed back in practice to currents that are considerably higher than are possible with a single rotor. It would then be possible to use very high currents and to develop the required differential torques without risk to the magnets. In other words, the solution of the invention enables a differential movement to be obtained between two superposed rotor parts in a first airgap. This solution is far from obvious because, a priori, having two rotor parts move in opposite directions in the same permanent magnet actuator has until now never been envisaged.

Accordingly, by means of the invention, a permanent magnet actuator may be obtained that may be fed with very high electrical currents and consequently supply a very high torque, and this with a long service life by virtue of avoiding the risk of demagnetization of the permanent magnets, and also with a very short response time, because of the low inertia of the rotor parts and the geometry of their drive tracks (see below).

The permanent magnets of the invention may be stuck directly to the substrates supporting them and possibly inserted in appropriate grooves produced in the substrates of the stator parts. If such grooves are used, their function is essentially to facilitate the positioning of the magnets during assembly of the stator part on which they are mounted. The depth of the groove is made sufficiently small compared to the height of a magnet to avoid creating magnetic short-circuits. The same applies to the width of the groove: it is made sufficiently small compared to the width of a magnet to avoid creating magnetic short-circuits. Moreover, the width of a groove is chosen taking into account the spread of the dimensions of the magnets resulting from their manufacturing processes, which are usually molding processes.

In the preferred embodiment, the substrates supporting the permanent magnets are of ferromagnetic material, preferably one with a high coefficient µr of relative magnetic permeability, which enables closure of the field lines of the magnetic circuits and facilitates sticking the permanent magnets by means of the magnetic adhesion that they then exert on the substrates, or even in some circumstances dispenses with any need for sticking them.

According to the invention, mechanical protection of the permanent magnets and the rotor parts is advantageously achieved by inserting between two adjacent magnets of the same stator part a non-ferromagnetic material shield the thickness of which is sufficient to prevent mechanical contact between the exposed surfaces of the magnets and the rotor parts nearest them. Each non-ferromagnetic material shield has tribological properties allowing minimization of any friction forces and mechanical wear. The shields are preferably portions of a single mechanical part fastened to the stator part with which it is in contact. These shields are preferably in electrically-insulative material. These shields are preferably produced from a fluoropolymer such as polytetrafluoroethylene, usually referred to as PTFE.

In a preferred variant, each rotor part comprises a single track, the drive track radial portions being connected to each other by tangential portions forming crenellations when the rotor part is seen from the front.

In a preferred embodiment, a rotor part is produced by a multi-layer printed circuit, a track being constituted by an even number of superposed electrically-conductive material layers adapted to be supplied with currents flowing in the same direction. The number of superposed electrically-conductive material layers is preferably equal to four.

The substrate of a rotor part is advantageously pre-impregnated, the layer or layers of electrically-conductive material being in copper and covered with an electrically-insulative material finishing layer.

In an advantageous embodiment the mechatronic circuit-breaker device comprises at least two distinct pairs of rotor parts superposed in the airgaps between the first stator part and the second stator part.

Two superposed rotor parts belonging to two distinct pairs may then be adapted to be moved in the same direction when all the tracks are supplied with current. Alternatively, two superposed rotor parts belonging to two distinct pairs may be adapted to be moved in opposite directions relative to each other when all the tracks are supplied with current.

All the tracks of the rotor parts are preferably supplied electrically in series with the same current.

The electrical connection between rotor parts is advantageously effected by flexible conductive wires.

There is preferably an even number of permanent magnets in a series of each stator part.

The invention also provides a set of actuators comprising at least two superposed permanent magnet actuators as described above, wherein the second stator part of one of the two actuators also constitutes the first stator part of the other of the two actuators, called the intermediate stator part, said intermediate stator part comprising the same series of permanent magnets with each pole apparent on one face of the same substrate. All the tracks of the rotor parts are then preferably supplied electrically in series with the same current with an electrical connection between rotor parts effected by flexible conductive wires.

All the rotor parts of the two actuators are preferably adapted to be moved in the same rotation direction and are mechanically connected at their periphery by rigid flanges each constituting a connecting flange. Two adjacent rigid flanges are advantageously connected to rotor disks adapted to be moved in opposite rotation directions relative to each other, each of the two flanges being mechanically connected to at least one link, each of the two links being mechanically connected to the same mechanical element, so that movement in rotation of the rotor disks in opposite directions generates movement in translation of the mechanical element. Each of the two adjacent flanges is mechanically connected to two links each mechanically connected to a distinct mechanical element so that movement in rotation of the rotor disks in opposite radial directions generates movement in translation of the two distinct mechanical elements in opposite directions relative to each other.

The invention also provides electrical switchgear adapted to switch and disconnect an electrical current comprising at least one set of actuators as described above and wherein a mechanical element is secured to a movable contact of a vacuum interrupter.

The invention finally provides use of electrical switchgear as described above as part of a mechatronic circuit-breaker device for breaking high-voltage direct currents.

BRIEF DESCRIPTION OF THE DRAWINGS

Other advantages and features of the invention emerge more clearly on reading the detailed description given with reference to the following figures, in which:

FIGS. 4A and 4B are diagrammatic sectional views showing part of an actuator of two different embodiments and showing the orientation of the magnetic fields in the permanent magnets, the directions of the currents in the drive tracks of the rotors, the rotation directions of the rotor disks, the repulsion forces between rotor disks and therefore the forces on the permanent magnets;

FIG. 9 is a detail view from the front of the mechanical connection between a set of actuators of the invention and mechanical members to be moved; and FIGS. 10A to 10C show in section details of the mechanical connection between a set of actuators of the invention and movable contacts of vacuum interrupters, respectively showing the closed, intermediate, and open position thereof.

DETAILED DESCRIPTION OF PARTICULAR EMBODIMENTS

Figure 1:
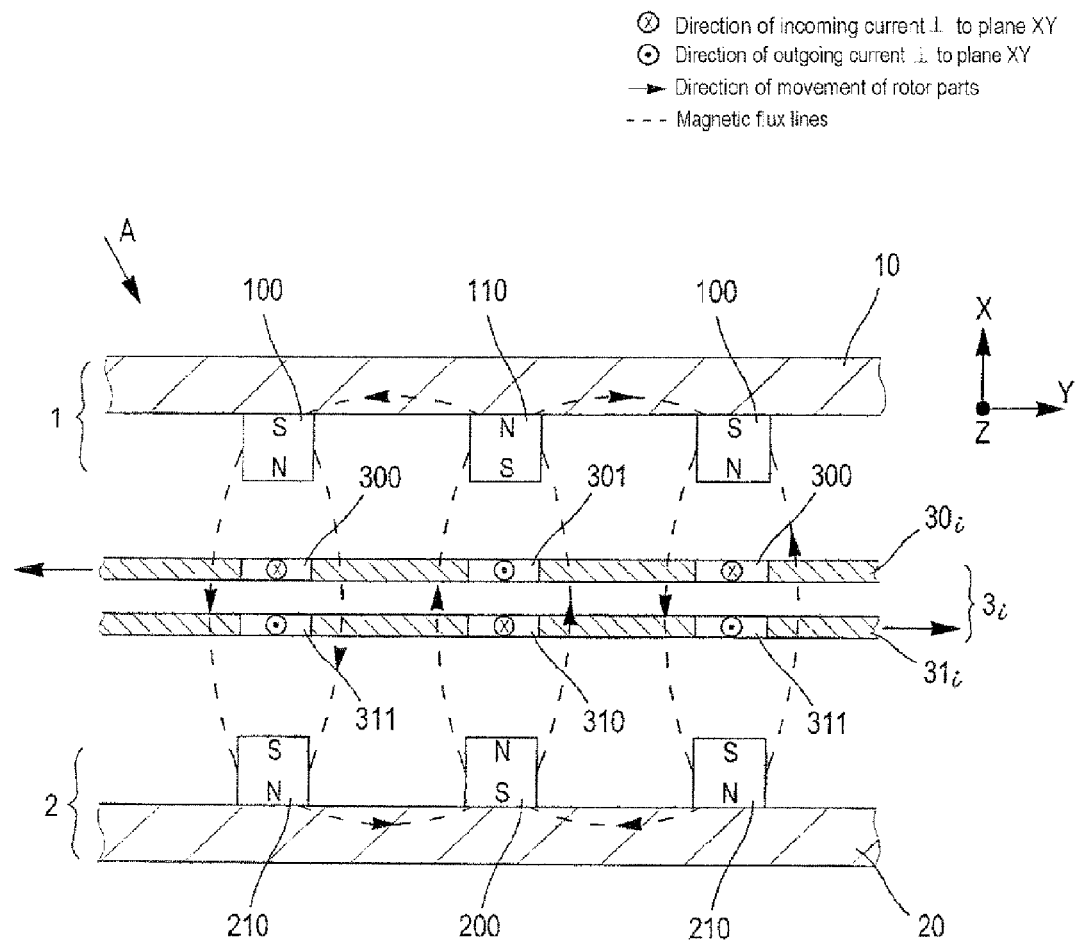
FIG. 1 is a diagrammatic sectional view showing the principle of producing a permanent magnet actuator of the invention.
Figure 2A:
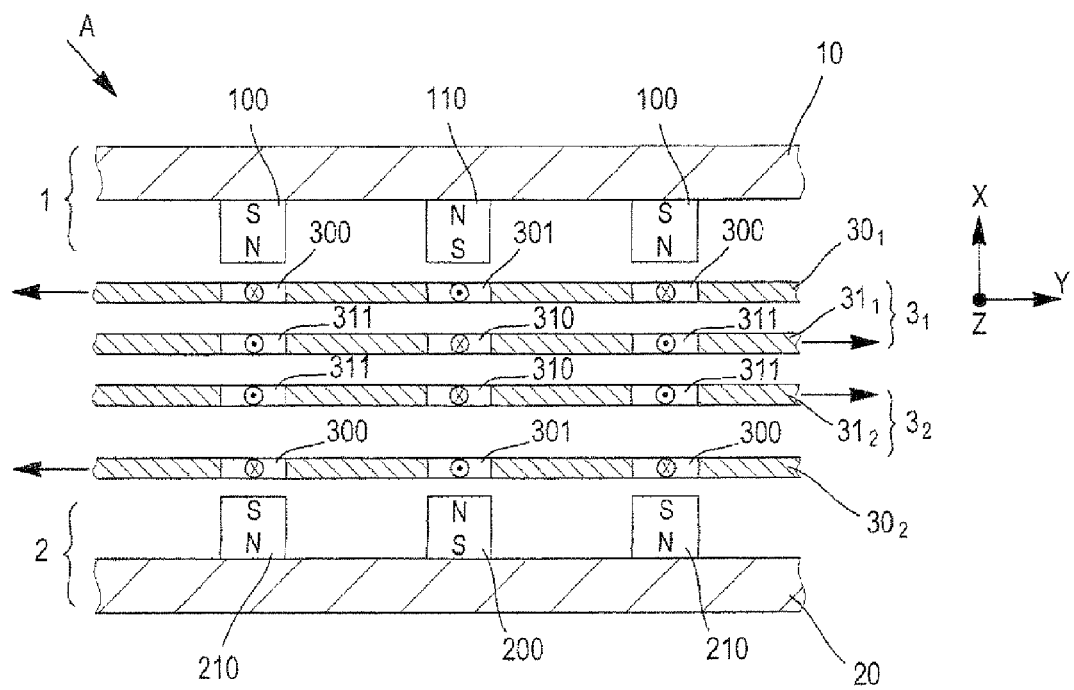
FIG. 2A is a diagrammatic sectional view of an actuator of one embodiment of the invention.
Figure 2B:
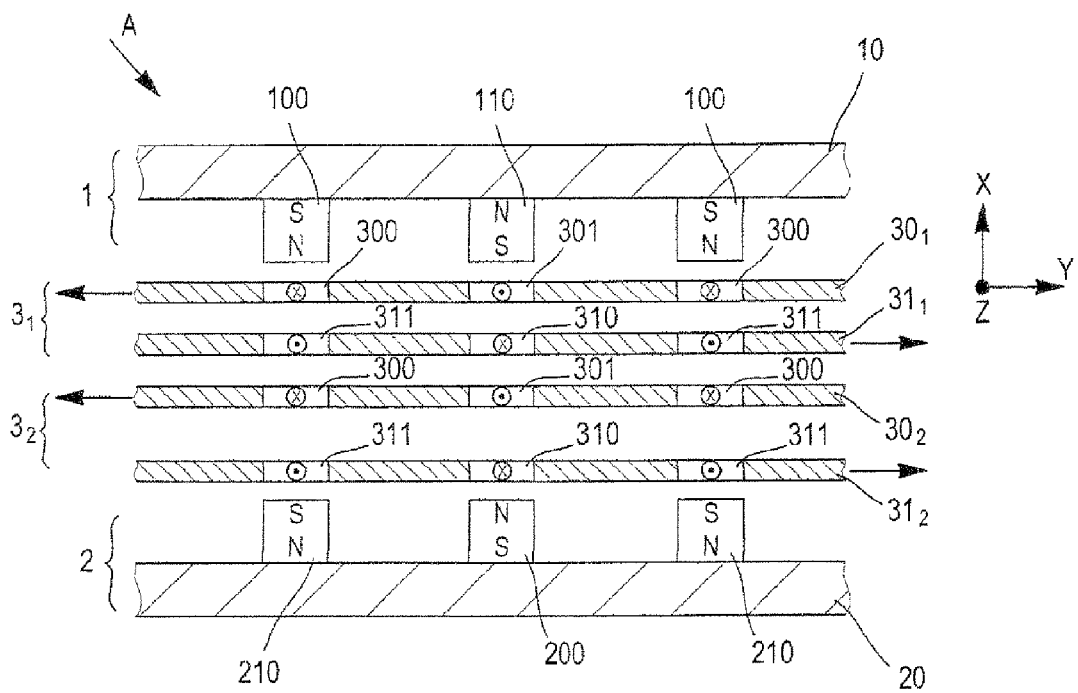
FIG. 2B shows an actuator conforming to a variant of the FIG. 2A embodiment.
Figure 3:
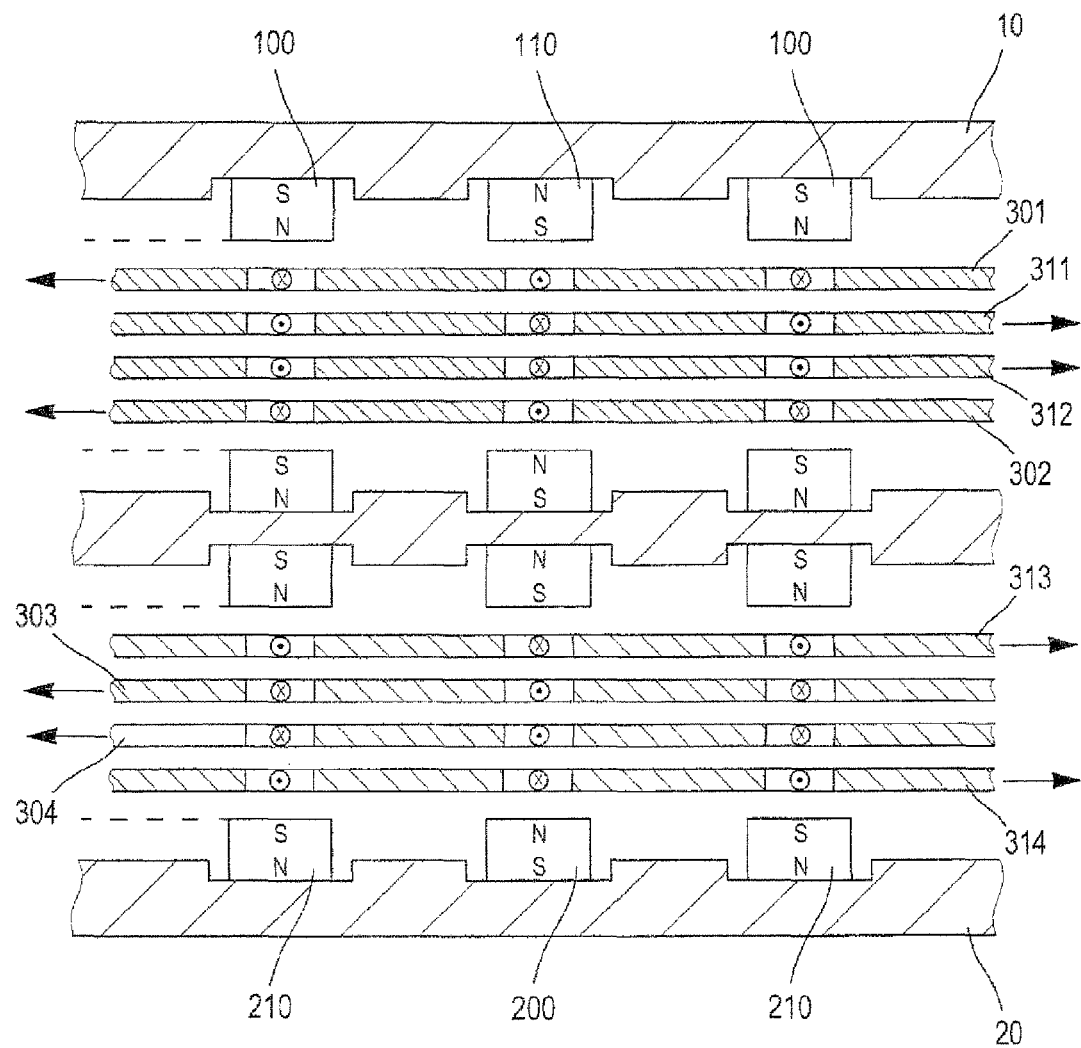
FIG. 3 shows a set of two actuators of one embodiment of the invention with increased drive torque compared to the embodiment of FIGS. 2A and 2B.

For clarity, the same symbols used in all the figures have the same technical meanings An actuator of the invention to be described may equally well operate as a linear actuator, as shown diagrammatically in FIGS. 1 to 3, or as a rotary actuator in disk (ring) form, as shown in FIGS. 6A, 6B, 7A, 7B, and 8. A linear actuator of the invention is thus, as it were, a limiting embodiment of a rotary actuator of the invention with a radius tending towards infinity. Also, for clarity and simplicity, the invention is described in this limiting situation and FIGS. 1 to 3 show an orthogonal system of axes X, Y, Z in which X, Y, and Z respectively designate axial, tangential and radial directions, the axis X of the system of axes being parallel to the axis of the symmetry of the surfaces of the stators to which the permanent magnets are fastened, the axis Z of the system of axes lying in the plane of symmetry of one of the magnets.

In other words, failing an explicit indication to the contrary, the directions of the currents and the directions of movement of the rotor parts are referred to these directions, without adopting a cylindrical frame of reference that would be more appropriate for a rotary actuator. In such a frame of reference, and in accordance with the invention, the magnetic fields are parallel to the direction X, the current directions to be considered in the areas of interaction with the magnetic field are along a radial vector parallel to the direction Z, and the directions of movement of the rotor parts are along an orthoradial or tangential vector parallel to the direction Y. In other words, if it is stated that rotor parts of an actuator of the invention move in opposite directions, this means in opposite rotation directions or in contrarotation.

Moreover, as indicated in the legend of FIG. 1:
- a cross indicates the direction of an incoming current orthogonal to the plane XY;
- a dot indicates the direction of an outgoing current orthogonal to the plane XY;
- an arrow indicates the direction of movement of a rotor part; and
- dashed lines indicate the magnetic flux lines created by the permanent magnets.

Similarly, there are designated by the same index 1 or 2 or 3 or 4 two rotor parts of the same rotor pair in the sense of the invention, i.e. moved by Lorentz drive forces in opposite tangential directions, i.e. in the direction of the axis Y as explained in detail below. Thus, in the general designation scheme, a rotor pair 3$i$ comprises two parts 30$i$, 31$i$.

By convention, and also with clarity in mind, a 0 designates a rotor part 30 moving towards the left in the figures and a 1 designates a rotor part 31 moving towards the right in the figures.

By convention, and also with clarity in mind, the reference 100 or 200 designates a permanent magnet oriented so that the north pole is nearer the airgap and the references 110 or 210 each designate a permanent magnet oriented so that the south pole is nearer the airgap. Thus a substrate 10 or 20 comprises an alternating series of permanent magnets 100, 110 or 200, 210. A permanent magnet between two airgaps is designated by both references, thus 100, 210 or 110, 200.

Finally, by convention, and again with clarity in mind, the reference 300 or 310 designates an electrically-conductive drive track portion in which the current liable to flow is an incoming current orthogonal to the plane XY and the references 301 and 311 each designate an electrically-conductive drive track portion in which the current liable to flow is an outgoing current orthogonal to the plane XY. It goes without saying that this convention assumes an unchanging power supply current direction and that in the event of a reversal of direction all the indicated rotation directions of the rotor parts are then reversed.

An actuator A of the invention is shown diagrammatically in FIG. 1.

It comprises firstly a first stator part 1 formed in a first substrate 10, preferably of ferromagnetic material, and comprising a first series of permanent magnets 100, 110 visible on one face of the first substrate and regularly spaced from each other in the circumferential direction. Two adjacent permanent magnets 100, 110 of the first series are oppositely oriented in the direction of the thickness of the first substrate.

Facing the first stator part 1 is a parallel second stator part 2 formed in a second substrate 20, preferably of ferromagnetic material, and comprising a second set of permanent magnets 210, 200 visible on a face of the second substrate 20 and regularly spaced from each other in the circumferential direction and with the same angular spacing as the first series of permanent magnets. Two adjacent permanent magnets 210, 200 of the second series are oppositely oriented in the direction of the thickness of the second substrate. The relative arrangement of the first stator part 1 and the second stator part 2 is such that a south pole or a north pole of a magnet from the second series 210 or 200 of the second stator part 2 faces an opposite north or south pole of a magnet from the first series 100 or 110 of the first stator part 1, a north pole always facing a south pole: intense magnetic fields are thus created in the airgaps between the first and second stator parts. They therefore form a set of magnetomotive interaction areas with magnetic fields parallel to the axis Z and thus orthogonal to the plane YZ. Because of the opposite pole orientations of the two adjacent permanent magnets of a stator part, the resulting magnetic field direction is reversed; however, as the currents in two adjacent drive tracks of the same rotor part also flow in opposite directions and the number of drive tracks of the same layer of the same rotor part is equal to the number of magnets of a stator part, the Lorentz drive forces exert on the drive tracks of the elements additional torques resulting at the level of each rotor part in a torque equal to the sum of the torques exerted on each of its drive tracks.

In other words, the facing permanent magnets form magnetic columns spaced from each other the magnetic field directions of which alternate, the magnetic flux of a column being closed in the two adjacent columns by virtue of the magnets and the substrates of the stator parts that bracket them. This closure of the magnetic flux lines ensures that the magnetization of the permanent magnets is maintained over time. This is why, in the preferred embodiment, the substrates of the stator parts are in ferromagnetic materials, such as soft iron alloys, the thickness of the substrate then being optimized to ensure field line closure without degrading the intensity of the magnetic field in the interaction columns. Note that, the magnetic field delivered by the permanent magnets being by nature a continuous magnetic field, it is not necessary to produce the stator parts by assembling magnetic laminations because no eddy currents or only negligible eddy currents flow on use of the actuator of the invention. Consequently, in a preferred embodiment the substrates of the stator parts are produced from solid, i.e. monolithic parts.

For specific applications requiring the use of stator parts in amagnetic materials, the permanent magnets being fastened to (supported by) a rigid substrate in a material with a low coefficient of magnetic permeability μr typically equal to 1, as for example with insulative plastic material substrates, closing the lines of the magnetic field becomes critical and the intensities of the usable magnetic fields are much lower than with ferromagnetic material stator parts.

The number of permanent magnets in parallel is preferably even. The magnetic columns are spaced from each other and define a magnetic field of tubular general shape. The spacing between magnetic columns, i.e. the chosen spacing between two adjacent permanent magnets, is to be determined as a function of the target application and notably of the target drive torque. A compromise is advantageously looked for between the cost of the permanent magnets and the target drive torque.

A substrate 10 or 20 thus serves as a mechanical support for permanent magnets 100, 110 or 200, 210, which magnets constitute the magnetic field inducing elements.

The first stator part 1 and the second stator part 2 are preferably identical, with a spacing conforming to a constant angular pitch between two permanent magnets, and are thus offset relative to each other to produce the corresponding relationship between the permanent magnet poles referred to above. All the permanent magnets are advantageously identical neodymium-iron-boron magnets. They may equally be of organic material, appropriately coated with a passivation layer to protect them against corrosion. More generally, they may equally be produced from other materials such as samarium cobalt, ferrites, or even from organic materials having ferromagnetic properties.

In the space between the first stator part 1 and the second start part 2 there is provided a pair 3$i$ of two superposed rotor parts 30$i$, 31$i$. In a preferred embodiment to be described below, the winding of each rotor part 30$i$, 31$i$ is constituted of a conductive metal, preferably copper, track distributed within the layers of a multi-layer printed circuit. At the electrical level, this continuous track is essentially formed firstly of a set of drive track portions that are oriented radially along the axis Z of the orthogonal frame of reference and that because of their geometrical position are subjected to the magnetic fields generated by the magnets and will be the seat of Lorentz forces when the appropriate current flows through them, and secondly of a set of portions of interconnection tracks, not subjected, to the first order, to magnetic fields generated by the magnets, and providing the electrical continuity of the winding of the rotor part concerned. The width of the drive track portions 300, 301 or 311, 310 is substantially close to but slightly less than that of the permanent magnets 100, 200, 110, 210 in the radial direction Y, so that in the extreme relative positions of the contra-rotating rotor portions, firstly the drive track portions 300, 301 or 311, 310 are always acted on by the magnetic field generated by the magnets between which they are positioned, and secondly the drive track portions 300 and 311 or 301 and 310, respectively, overlap sufficiently for the effect of magnetic field neutralization that they generate to be effective, thus preventing any risk of demagnetization of the permanent magnets 100, 200, 110, 210.

In a preferred embodiment, the drive track portions have a width in the range 5 millimeters (mm) to 20 mm and a thickness in the range 25 micrometers (μm) to 100 μm. The interconnecting track portions for their part have a width chosen to optimize the internal resistance of the winding thus constituted by arriving at a compromise between a small width resulting in a small overall size at the cost of a high internal electrical resistance and a large width resulting in a lower internal resistance at the cost of a large overall size. In a preferred embodiment, the interconnecting track portions have a width in the range 5 mm to 20 mm and their thickness is in the range 25 μm to 100 μm.

Note that the drive track portions are regularly spaced from each other in the circumferential direction with the same angular spacing as the first and second series of permanent magnets.

According to the invention, two adjacent track portions 300, 301 or 311, 310 in the same rotor part 30i or 31i are adapted to be supplied with currents flowing in opposite directions. Two superposed track portions 300, 311 or 301, 310 of the same rotor part pair 3i are adapted to be simultaneously supplied with currents flowing in opposite directions.

Figure 1A:
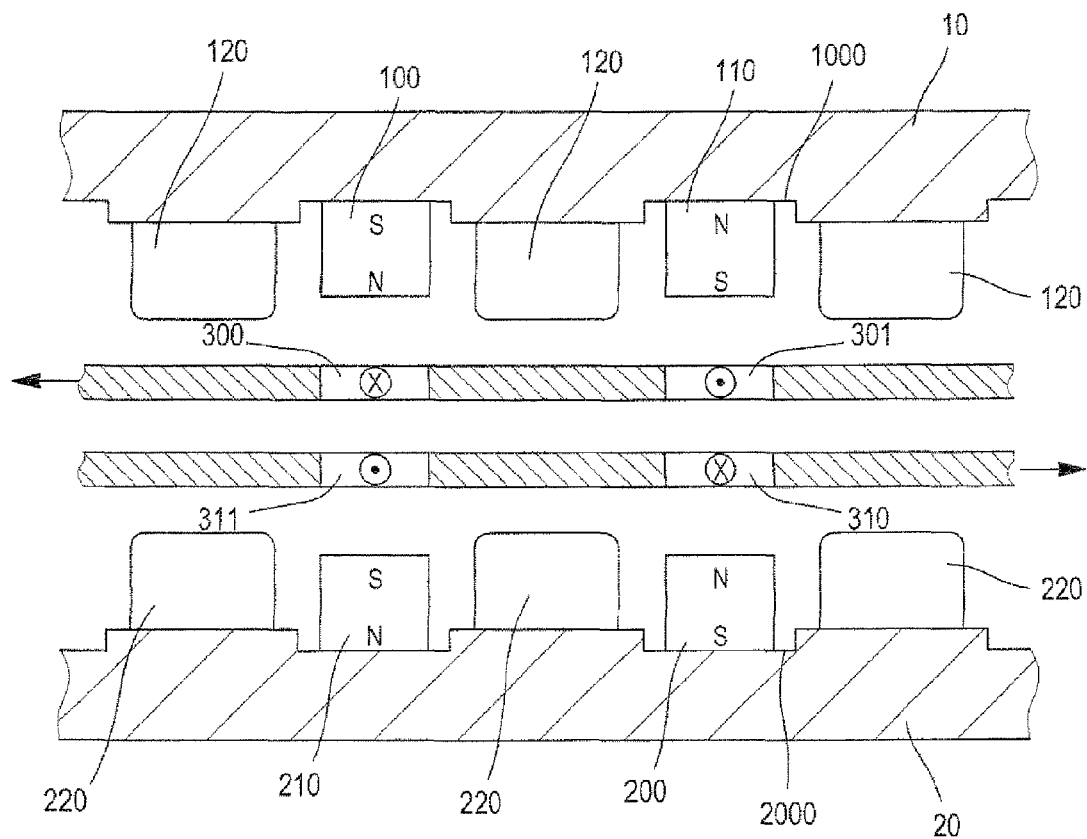
FIG. 1A shows an actuator conforming to a variant of the FIG. 1 embodiment.

To protect the permanent magnets 100, 110 and 200, 210 and the rotor parts 30i, 31i, a non-ferromagnetic material shield 120, 220 is inserted between two adjacent magnets of the same stator part, as shown in FIG. 1A. This shield 120, 220 has a thickness sufficient to prevent mechanical contact between the exposed surfaces of the magnets and the rotor parts nearest them. They also have tribological properties enabling friction forces and mechanical wear to be minimized. These shields 120, 220 advantageously form part of a single mechanical component fastened to the stator part with which it is in contact. These shields are preferably in an electrically-insulative material. These shields are preferably produced from a fluoropolymer such as polytetrafluoroethylene (PTFE), for example.

In this FIG. 1A there may also be seen an advantageous variant whereby the permanent magnets of the invention are stuck directly to the substrates 10, 20 supporting them and are furthermore inserted into appropriate grooves 1000, 2000. The function of such grooves 1000, 2000 is essentially to facilitate positioning the magnets during assembly of the stator part on which they are mounted.

In the preferred embodiment of the invention, the multi-layer printed circuit serving as the support for the winding of a rotor part is itself produced in the usual way for printed circuits for electronics, namely by etching and assembling by bonding and applying pressure to a plurality of subsets of substrates in silica fiber known in the art as pre-impregnated substrates. The material of these pre-impregnated substrates is chosen so that its mechanical properties, notably its Young's modulus, make them highly resistant to pulsed or continuous traction and compression forces exerted in directions contained within their plane.

Figure 5:
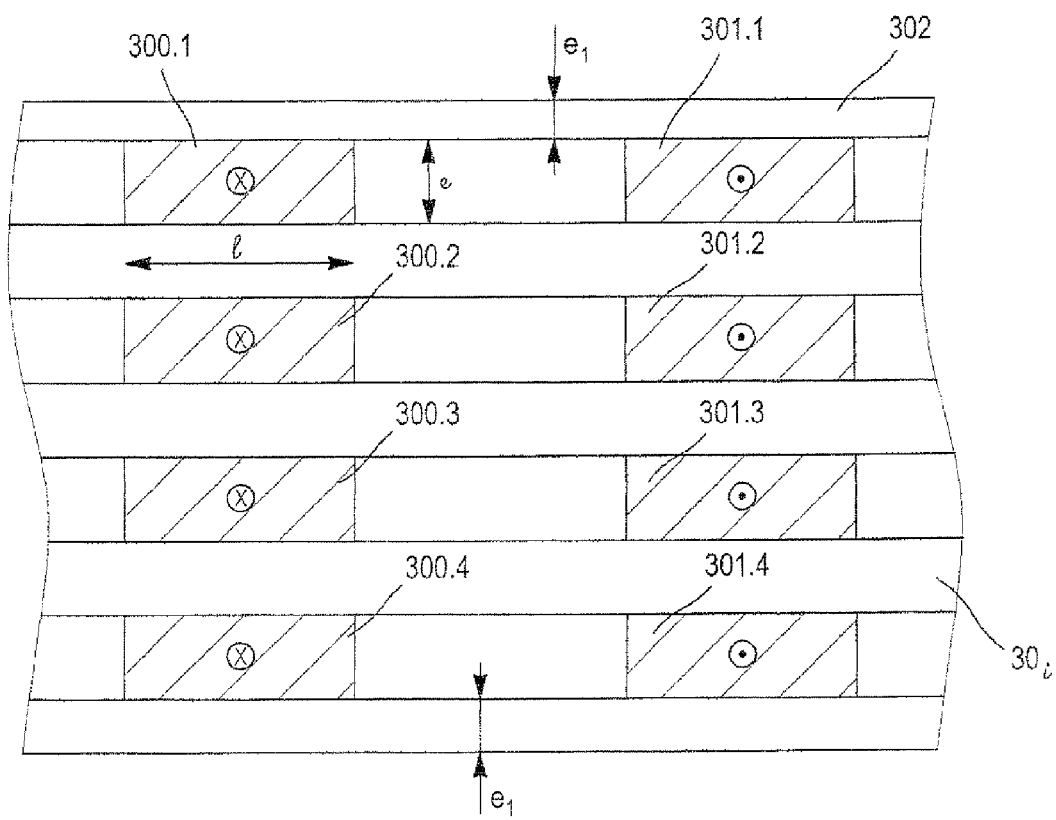
FIG. 5 is a diagrammatic sectional view of part of a rotor of an actuator of one variant of the invention.

As shown in more detail in FIG. 5, in a preferred embodiment of the invention, this multi-layer printed circuit is constituted of four layers of electrical conductors 301.1, 301.2, 301.3, 301.4 dedicated to the drive track portions and interconnecting track portions and is covered on either side by a protection layer called the closure layer intended firstly to provide electrical insulation of the outermost track portions and secondly to reduce the friction forces when one rotor portion slides relative to an adjoining other rotor portion or relative to the protective shields 120, 220 of the permanent magnets as explained above.

Both the thickness of the driving and interconnecting track portions and also the thickness of the pre-impregnated substrates constituting a rotor portion are chosen firstly to ensure reliable transmission of mechanical forces from the drive track portions to the substrate of the rotor portion via the various pre-impregnated substrates and secondly to impart to the assembly a thickness sufficiently small for a plurality of rotor portions constituted in this way to be inserted into the same airgap between two facing stator parts.

The total thickness of a rotor portion constituted in this way is preferably in the range 0.5 mm to 3.2 mm.

Moreover, the permanent magnets facing each other are subjected to pressure caused by the magnetic energy that they store, most of this energy being contained within the magnetic columns defined by the magnets. The pressure "P" may be calculated assuming that the intensity "B" of the magnetic field is uniform within a magnetic column. The following formula is then obtained, in which μo designates the permeability of a vacuum:

$$P=B^2/(2 \cdot \mu o)$$

Thus each permanent magnet is subjected to a force that it transmits to the stator part to which it is fastened and that tends to move it towards the magnet it faces in the magnetic column that they both create. If the number of magnets in a stator part is high, and if the section of the magnetic columns in a plane parallel to the disk to which the magnets belong is also large, then the sum of the attraction forces exerted by each magnet of a stator part may become considerable, a value of the order of 10,000 newtons (N) being commonly encountered. In other words, a very high drive torque may be obtained.

For this reason, in a preferred embodiment of the invention, the distance between two facing stator parts is maintained constant by means of amagnetic material spacers distributed around the axis of symmetry of the disk of the stator parts to which the magnets belong. Care is taken that the number and the section of the spacers are sufficient for the two stator parts not to suffer any deformation and to remain parallel to each other and at the required distance.

In a preferred embodiment of the invention, these spacers are positioned in the areas as close as possible to those in which the attraction forces between stator parts are exerted, in order to prevent the risk of static deformation of their substrates. Consequently, the judicious choice is made to provide the rotor parts with holes, or openings, allowing said spacers to pass through them. These holes preferably have a shape and dimensions adapted to allow free relative movement of the rotor parts without being impeded by the spacers, i.e. without the spacers becoming unwanted stops.

In a preferred embodiment of the invention, these holes are positioned and machined precisely in order to effect pre-positioning of the rotor parts in the airgaps, this pre-positioning providing a first level of concentricity between the rotation axis of the rotor parts and the axis of symmetry of the disks of the stator parts to which the magnets are fastened. Such pre-positioning offers sufficient mechanical clearance to allow coupling of the rotor parts to their kinematic chain linking them to the mechanical switches that they must operate without generating a condition of static indeterminacy.

The operation of an actuator A of the invention that has just been described is then as follows: when all the tracks are supplied with current, the Lorentz drive forces generated by said current flowing in the magnetic fields created by the first and second series of permanent magnets, in the airgaps between the first stator part 1 and the second stator part 2, move one rotor part 30$i$ in the opposite tangential direction to the other rotor part 31$i$ along the axis direction Y.

In a variant, the supply current is the same for all the electrically-conductive material tracks constituting the winding of each rotor part and the two rotor parts are supplied with current in series with each other. Furthermore, the relative angular positioning of each of the two rotor parts is advantageously chosen carefully so that the currents in two drive track portions respectively belonging to one and to the other of the two rotor parts and situated in the same magnetic column are in opposite directions. Care is of course also taken to ensure the respective positioning of the drive track portions, magnets and spacers maintaining the distance between the two stator parts.

Such an actuator of the invention may be supplied with current of very high value because a zero total current is "seen" by each of the permanent magnets in a magnetic column formed by the facing magnets 100, 210 or 110, 200. The risk of them being demagnetized is therefore very greatly reduced. With very high currents a very high drive torque is obtained for an actuator A of the invention.

In practice, an actuator of the invention is advantageously designed for small movements of the rotor parts, of the order of a few millimeters (mm), or an angular movement of a few degrees. Small movements may be sufficient to move a mechanical element such as a movable contact of a mechanical switch, as described in detail below. In practice the actuator of the invention is also designed so that the angular relative movement is such that, in the extreme moved position of each rotor part, the conductive track portions 300, 311 or 301, 310 are always in an area facing the permanent magnets.

To increase the drive torque of an actuator A of the invention, it is possible to increase the number of rotor parts 3$i$ in the same airgaps between the two stator parts 1, 2. Care is advantageously taken to find an optimum distance between rotor parts by arriving at an appropriate compromise between the value of the magnetic fields to be achieved and the number of rotors in the airgaps. In a preferred embodiment of the invention, the number of rotor parts in the same airgap is an even number in the range 4 to 8, the thickness of the airgap being in the range 4 to 10 millimeters.

FIGS. 2A and 2B show two different ways to increase the drive torque with two rotor pairs 31, 32 with two superposed parts 301, 311 and 302, 312.

In the FIG. 2A variant, two superposed rotor parts 311, 312 belonging to the two separate pairs 31, 32 are adapted to be moved in the same direction when all the tracks are supplied with current.

Alternatively, in the FIG. 2B variant, the two superposed rotor parts 311, 312 belonging to the two separate pairs 31, 32 are adapted to be moved in opposite directions when all the tracks are supplied with current.

These alternatives allow different ways of resolving the compromise between firstly managing the forces of repulsion or attraction between rotor parts, which forces have a beneficial or negative effect on friction between rotor parts, according to their relative rotation directions, and secondly auto-compensating the magnetic fields generated by the currents flowing in each drive track portion.

Where the electrical power supply is concerned, two rotor parts of the same pair 31, 32 may be supplied with current in series or in parallel. Two pairs 31, 32 of the same airgap may equally be supplied with current in series or in parallel (see FIG. 2A, FIG. 2B or FIG. 3).

Figure 8:
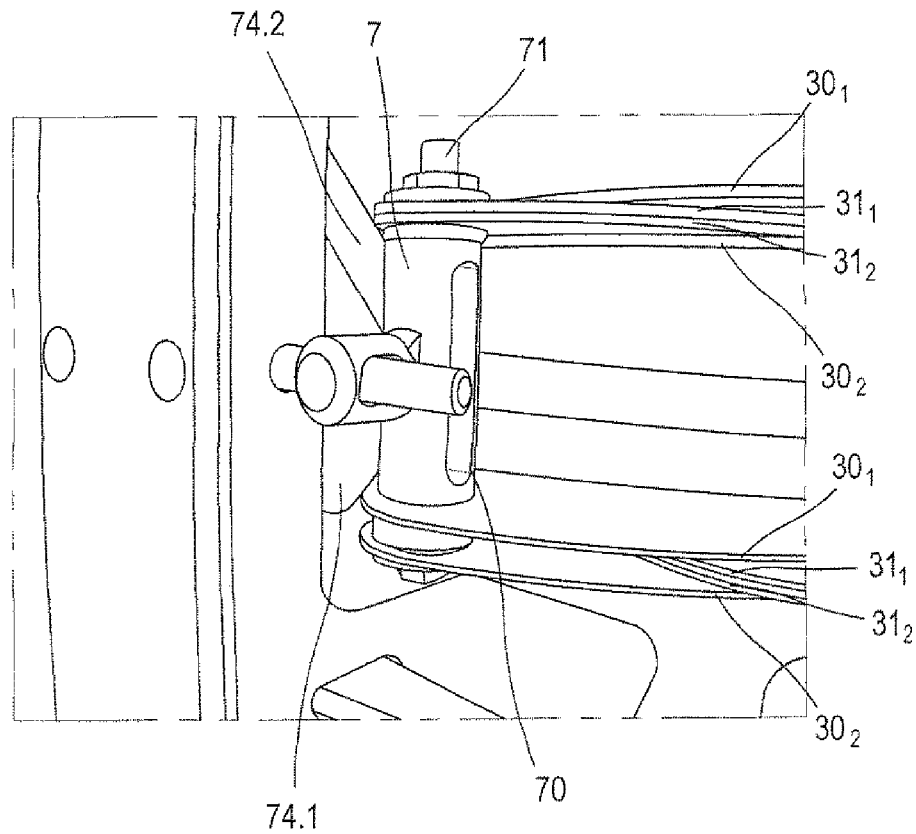
FIG. 8 is a detail view in perspective of a set of two actuators of the invention showing their relative arrangement and a mechanical connection between them.

FIG. 3 shows a preferred embodiment in which the rotors of the actuator are respectively constituted of two pairs of four rotor parts 301, 302; 303, 304; 311, 312; 313, 314, divided between two airgaps. The arrangement of the rotor parts within the same airgap is that of FIG. 2A. The intermediate stator part 12 situated between the two airgaps is essentially used as a magnetic relay, i.e. its function is no longer to close the magnetic field lines. The permanent magnets situated on either side of its plane of symmetry ensure the continuity from a magnetic column of the first airgap to the magnetic column of the second airgap, these columns being closed via the stator parts 10 or 20 situated on either side of the intermediate or central stator part 12. This preferred arrangement has multiple advantages. Firstly, it achieves an increase in the drive torque because of the use of eight rotor parts instead of four as in FIG. 2A. In contrast, as shown in FIG. 8, the rotor parts intended to turn in the same given direction are equally divided between the two airgaps. It is thus possible, by a judicious choice of the distances between the planes of symmetry of each airgap, and by using spacers mechanically connecting the rotor parts intended to move in the same direction, to confer on the rotor parts constituted in this way a stiffness very much greater than that which may be envisaged in the situation of FIGS. 2A and 2B. Thus not only is the actuator of the invention able to develop extremely high torques, of the order of several thousand Nm, but also to transmit these torques to the objects to be moved without risk of wear or deterioration.

Thus the FIG. 3 embodiment is preferred, as explained above with reference to FIGS. 4A and 4B, which show in detail at the level of the same magnetic column 100, 210, 100 with two superposed actuators A1, A2, the distribution of the magnetic fluxes and the Lorentz drive forces. When two superposed rotor parts are moved in opposite directions and touch, they may cause friction and therefore deteriorate. However, if two superposed rotor parts enclose a magnetic field at their interface, the field tends to push them apart.

Also, the preferred variants are those that reduce both friction and repulsive forces between superposed rotor parts. FIG. 4A shows a preferred variant of this kind with an odd number of pairs of immediately superposed rotor parts that are moved in the same direction, here one pair. FIG. 4B also shows a preferred variant of this kind but with an even number of pairs of immediately superposed rotor parts that are moved in the same direction, here two pairs. Note here that the areas in which the magnetic fields created by the rotor parts are high, i.e. higher than over the rest of a magnetic column, are indicated in these FIGS. 4A and 4B by broader and darker lines. Note also the vertical arrows represent the forces acting in the direction of the height of an airgap. Accordingly, a rotor part that is bracketed on either side by a rotor part is either pushed away from said rotor part or has no relative movement relative to said rotor part: the friction is then minimized. A rotor part that is adjacent a stator part may transmit a force (torque) thereto in the direction X, i.e. along the axis of the actuators. The arrangements of FIGS. 4A and 4B enable these deleterious axial forces to be compensated as much as possible in the direction X of the actuators. Whatever the chosen current direction, the permanent magnets 100 or 210 of the stator parts are not subjected either to any resultant magnetic force or to any magnetic resultant torque in the direction X: as symbolized, the vertical arrows on the magnets 100 or 210 cancel out overall. Firstly the forces between the rotor parts and the permanent magnets are small and may be considered negligible, and secondly the forces between two adjacent rotor parts are independent of the direction of the current itself. Moreover, it should be remembered that the presence of shields 120, 220 in materials having good tribological properties firstly prevents direct contact of a rotor part with a permanent magnet and secondly facilitates relative sliding of that rotor part on the shields.

This relates to the permanent magnets 100 or 210 that are not at one end of the actuators, i.e. at the ends of the series of permanent magnets, which therefore applies to all the magnets of an actuator of the invention operating by rotation of its rotor parts. In contrast, in the situation of a linear actuator, considered as the asymptotic limit of a rotary actuator, the end permanent magnets must inevitably resist a resultant force and a resultant torque in the axial direction of the actuator or actuators. As is clear from FIGS. 4A and 4B, the adjacent rotor parts that are moved (turned) in the same direction do not move relative to each other in practice. Linking them mechanically may thus be envisaged, or even manufacturing them in one piece. Note that in the FIG. 4B variant the rotor parts adjacent the stator parts, i.e. nearest the permanent magnets, may in a non-preferred embodiment be fastened firmly thereto. This has the benefit of an electromagnetic repulsion (a bearing) that, by pushing back the nearest rotor part free to move, enables friction to be reduced but at the cost of Joule effect losses in the rotor parts sacrificed in this way, in the sense that they do not contribute to providing the actuator driver torque. FIG. 4B shows diagrammatically a darker box C that symbolically represents the fastening together of a stator part 100 or 210 and the adjacent rotor part, this rotor part then playing the magnetic bearing roll, the arrows indicating their movement becoming meaningless. In the preferred embodiment of the invention, this frame may be ignored and the arrows resume their usual meaning FIG. 5 shows an advantageous variant of a rotor part that enables a high value to be obtained for the drive torque whilst minimizing the stray inductance. The rotor part 30i shown is thus constituted by a multi-layer printed circuit with four superposed layers of electrically-conductive material that form a single track portion. Thus the track portion 300 in which an incoming current flows in the plane XY consists of the four superposed layers 300.1, 300.2, 300.3, 300.4. Similarly, the adjacent layer portion 301 in which a current flows in the opposite direction is constituted of four superposed layers 301.1, 301.2, 301.3, 301.4. An even number of conductive layers superposed to constitute the same track portion 300 or 301 is advantageous. With an even number layers, the return path of a given layer is then in another superposed layer of the printed circuit. The self-inductance resulting from the conductive material tracks produced in this way may be as low as possible. In other words, the aim is to minimize the self-inductance of the current conducting materials in the same rotor part. The substrate of the rotor part 30i is preferably pre-impregnated, with a material such as epoxy resin, the electrically conductive material layers are in copper and are covered with a finishing layer 302 in electrically-insulative material. There is obtained in this way a rotor part of mass and inertia that are minimized. In practice, portions 300, 301 of conductive track 4 with a relatively wide and thin profile may be produced to reduce the skin effect, also known as the Kelvin effect whereby, at a certain high frequency, the current tends to flow only on the surface of the conductors. With such a wide and thin profile, the mechanical adhesion between the substrate 30 and the conductive tracks 4 is also increased and thus increases the mechanical coupling between them for the transmission of forces. For example, a conductive track 4 may have a width t of the order of 12 to 15 mm for a thickness e of the order of 70 μm. By way of example, the protective layer 302 may have a thickness of the order of 70 μm.

Figure 6A:
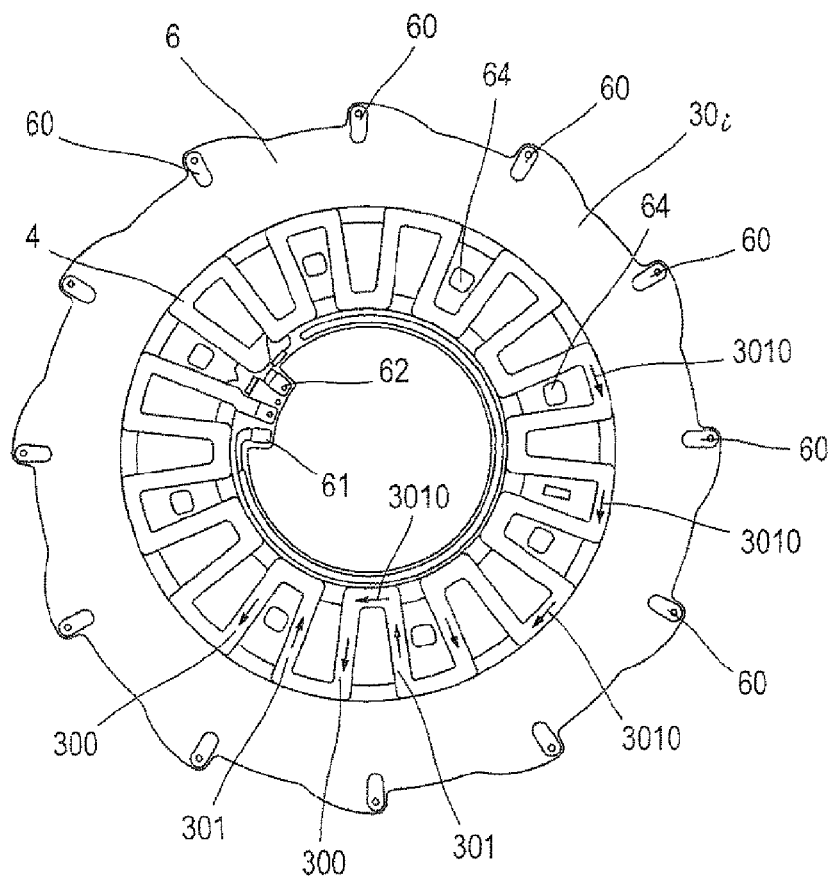
FIGS. 6A and 6B are respectively front and perspective views of a rotor part of an actuator of the invention.
Figure 6B:
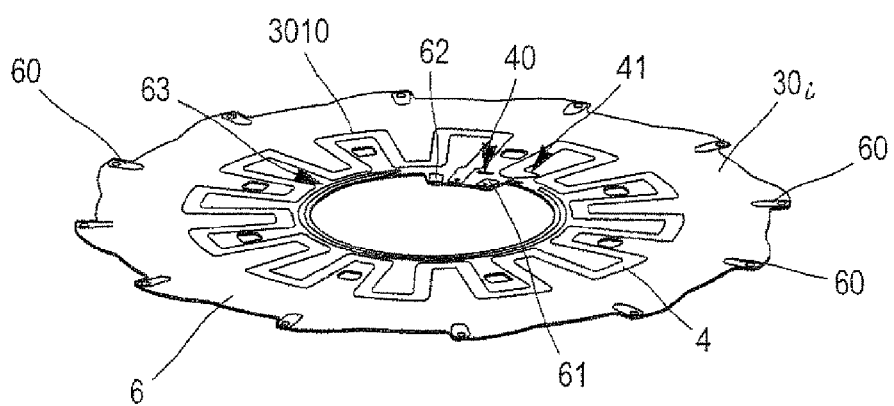
Figure 7:
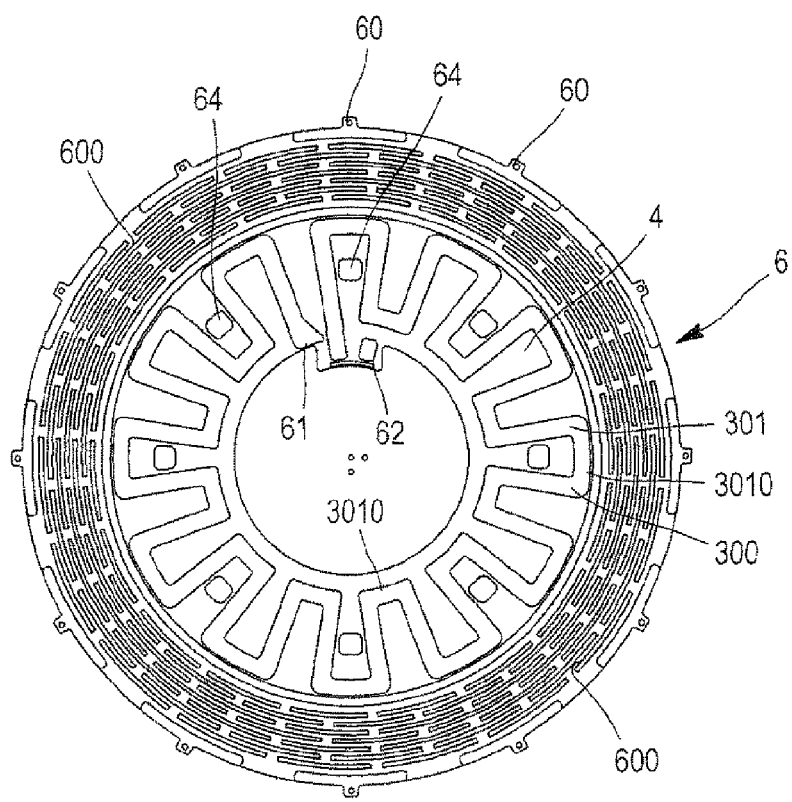
FIG. 7 is a front view showing a rotor part of an actuator of a variant of the invention.
Figure 7A:
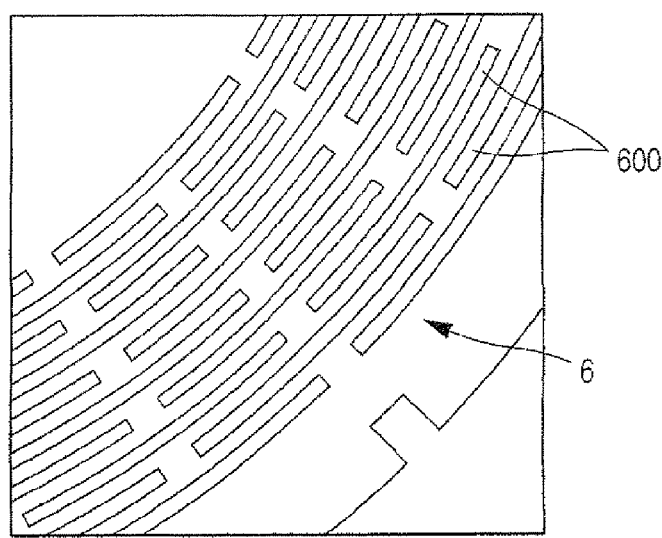
FIG. 7A is a detailed view of a rotor part of the FIG. 7 variant.

FIGS. 6A and 6B show a rotor part 30i conformed to the general shape of a disk 6, more exactly a ring. The rotor disk 30i, 6 comprises a single track 4 of electrically-conductive material produced in an insulative substrate. The embodiment shown is particularly advantageous because all the radial track portions 300, 301 are interconnected by tangential portions 3010 forming crenellations. This enables simple interconnection between all the radial portions 300, 301 facing the permanent magnets of the stator parts. In other words, the radial portions 300, 301 that generate the Lorentz drive forces required in actuators of the invention are interconnected optimally here to contribute to the total torque. In the example shown, the radial portions 300, 301 are produced with an angular spacing of 15° between two adjacent portions. Inlet and outlet connecting tongues 61, 62 respectively for input and output of the current I in the track 4 are provided side-by-side inside the ring 6 for simple electrical connections by flexible wires. As mentioned above, the angular or linear movement of the rotor parts being very small, the electrical connections may be made entirely with flexible wires. In addition to the fact of the lower weight of electrical connecting wires, they do not increase the inertia of the rotor parts. The disk 6 comprises at its periphery a plurality of holes 60 for fastening a mechanical connection flange otherwise known as a movement transmission flange, as explained below. A disk 6 also comprises a conductive track 63 at its internal periphery that constitutes a screen adapted to protect the control electronics from electric fields liable to induce capacitive currents. To provide the electrical power supply, there may be as many controlled pulsed current generators as rotor disks. For simplicity and for cost reasons, this number may advantageously be reduced and all the rotor parts connected in series so as to have only one controlled pulsed current generator for a given actuator or for a set of two actuators A1, A2 as described in detail below. To provide the electrical power supply, all of the rotor parts of the same actuator may also and advantageously be connected in series. In practice, this is preferably achieved by means of flexible connecting wires at the level of the input and output connecting tongues 61, 62. With flexible wires, the electrical series connection is provided simply and moreover without adding superfluous mass that could penalize the inertia of the rotor parts. As shown in FIGS. 7A and 7B, the rotor disk 6 is pierced with holes 64 that pass through it. Each of these holes 64 accommodates a spacer that is not shown. This spacer is produced in an amagnetic material so as not to disturb the magnetic flux in the active part of the airgaps. The function of the spacers is to guarantee the thickness of the airgap to prevent pinching of the rotor parts between the stator parts. Note that a functional clearance is provided between a spacer and the holes 64 in which it is accommodated. This functional clearance must be sufficient to enable the predetermined angular movement of each rotor disk 6.

FIGS. 7A and 7B show a variant of a rotor disk 6 of the invention. In this variant, the peripheral part of the disk 6, that does not comprise conductive tracks and is therefore entirely in electrically-insulative material, is pierced with openings 600 regularly spaced along a given diameter and also offset from a given diameter to another diameter as shown better in FIG. 7A. This increases the path of leakage currents likely to occur at the surface of the electrical insulator 30 of the rotor part support. In other words, the length of the leakage lines is increased over the rotor part. In other words, the aim is to produce dielectric chicanes between these openings 600.

FIG. 8 shows the advantageous fastening of a plurality of mechanical connecting flanges 7 which fasten between them four identical rotor parts 301, 302; 303, and 304, which belong to two actuators A1, A2 superposed and turn in the same rotation direction Y when subjected to an electrical current. Each rotor part 301, 302; 303, and 304 is produced in the form of an annular disk 6 as shown in FIGS. 7A and 7B. Thus a mechanical connecting flange 7, constituted by a hollowed-out tubular portion, is screwed through the holes 60 firstly to the two rotor parts 301, 302 of the actuator A1 from above by means of a nut and bolt system 71 and secondly to the two rotor parts 303, 304 of the actuator A2 from below by means of a nut and bolt system 72. The nut and bolt systems 71 or 72 may be replaced by any equivalent mechanical system. Fastening is provided over the whole of the periphery of the rotor disks 301, 302; 303, and 304 that turn in one direction and those 311, 312; 313, and 314 that turn in the opposite direction so that two adjacent rigid flanges 70 are connected to rotor disks adapted to be moved in opposite directions relative to each other. Beyond their function of mechanical transmission of rotation movement of the rotor disks as explained below, the proposed connecting flanges 70 enable the creation of a sort of self-supporting rigid structure. Compared to prior art rotary actuators, this is particularly advantageous because here numerous parts are dispensed with, notably the shaft supporting rotor part proper and the bearings supporting the shaft.

FIG. 9 shows the mechanical transmission means between the rotation movement of the rotor disks of the actuators and the mechanical elements to be moved in translation. Here each of two adjacent flanges 7d, 7g that move in translation in opposite directions along the axis Y, because of the rotation in opposite directions of the rotor disks that they fasten, is articulated to two links 74.1 and 74.2 by a shaft 73 in the hollowed out part of the tube. Each of the two links 74.1 and 74.2 is articulated to the same mechanical element 8.1 and 8.2, respectively. Accordingly, when the rotor disks are rotating in opposite directions, the two adjacent flanges 7g, 7d are moved simultaneously in translation in opposite directions along the axis Y and thus generate simultaneous movement in translation along the axis X of each mechanical element 8.1 or 8.2. In other words, with the mechanical connection shown in FIG. 9, a deformable parallelogram is defined that enables optimum distribution of the mechanical transmission forces between the rotor disks and the mechanical elements to be moved.

Finally, FIGS. 10A to 10C show the preferred application in which the mechanical element 8.1; 8.2 that has just been described is secured to a movable contact 90 of a vacuum interrupter 9 the other contact 91 of which is stationary. As emerges from these figures, a very small angular movement ($\alpha 2 - \alpha 0$) of the rotor parts of actuators of the invention, not shown, enables movement from the closed position (FIG. 10A) to the fully open position (FIG. 10C) of the two vacuum interrupters 9 by the mechanical connection flanges 70 and the links 74.1, 74.2. These vacuum interrupters 9 constitute part of electrical switchgear for producing, interrupting or breaking a high current at a high voltage. In their main application to disconnection in a mechatronic circuit-breaker as described and claimed in the patent application filed the same day as the present application, WO/2013/092873, published Jun. 27, 2013, -and entitled "Dispositif disjoncteur mécatronique et procédé de déclenchement associéet application àla coupure de courant continu élevé" ["A mechatronic circuit-breaker device, an associated triggering method, and an application to breaking high direct currents"], the vacuum interrupters do not have to break this current themselves.

The main target application for these vacuum interrupters is to constitute an electromechanical switch-disconnector system in a mechatronic circuit-breaker device intended to break direct or alternating currents at high voltage in very short times.

The permanent magnet electromagnetic actuators of the invention and the mechanical switch-disconnector that it actuates are of greatest benefit when they are produced in the following preferred manner consisting in using modular design at two levels.

A first level concerns the capacity, for a so-called closed position of the switch-disconnector, to carry continuous high currents, for example 3000 amps (A), with a low level of insertion losses, and, for a so-called open position of the same switch-disconnector, to isolate from each other primary circuit portions at a high voltage. In conventional electrical switchgear, this dual function aspect is reflected in massive moving parts, weighing several kilograms, because of the large areas of contact and high bearing pressures required to produce a low contact resistance, and large distances, of several centimeters, between contacts in the open position, in order to withstand the voltages. Also, the first modular design feature of the invention consists in dividing the primary conductor into a plurality of sub-branches, each sub-branch having the same functions as a single branch, but with reduced stresses. Accordingly, in a preferred embodiment of this first modular design feature of the invention, the primary conductor is divided into twelve sub-branches between which the current is divided when the switch-disconnector is in the closed position. In this preferred embodiment of the invention, when the switch-disconnector is divided into twelve pairs of vacuum interrupters as shown in FIG. 10, when it is in the closed position each vacuum interrupter has to conduct only one-twelfth ($\frac{1}{12}$) of the total current, assuming that it is distributed uniformly to each pair of interrupters. With the above-mentioned example of a total primary current of 3000 A, each pair of interrupters in series has to pass only 250 A. It is then clear that the dimensions of the contacts and the static pressures in the closed position are considerably less than in the situation of a single interrupter offering the same performance. The electromagnetic actuator of the invention is produced from printed circuit rotor parts as shown in FIGS. 6 and 7, arranged in the form of contra-rotating rotors as shown in FIGS. 3 and 8. It is therefore entirely suitable for actuating a plurality of vacuum interrupters pairs (modules) as shown in FIG. 8 uniformly distributed around the rotors of the actuator of the invention. When the vacuum interrupter modules are suitably stationary relative to a frame of reference that is stationary relative to the stators of the actuator, the rotor parts are then automatically positioned by virtue of their coupling to the vacuum interrupter modules. The risk of static indeterminacy, in the mechanical sense of the term, is avoided by the appropriate clearances, in particular by the clearances provided in the holes through which pass the positioning spacers of the stator parts.

A second modular design feature concerns the capacity to withstand high voltages in the open position. In conventional electrical switchgear, this leads to the necessity to move massive contact parts, weighing several kilograms, over distances of several centimeters, and this in very short times and at relatively high specified speeds, which requires high driving energies. In the high-voltage field there is known a so-called dual movement technique that consists in simultaneously moving the two facing contacts of the same switchgear at a speed substantially equal to half the required differential speed. To a first order, the consequence of this is to reduce by half the mechanical energy necessary for the operation. The second modular design feature of the permanent magnet electromagnetic actuator and the mechanical switch-disconnector of the invention thus consists in generalization of the objective targeted by the double movement feature, namely minimizing the operation energy. The second modular design feature of the invention consists in a modular design of the mechanical switch-disconnector to allow the series connection of a plurality of identical mechanical switch-disconnectors. This assumes the capacity to provide the energy to operate live objects, without reference to ground. The advantages of the two modular design features referred to that complement the differential actuator solution of the invention, given the mode of use of such switchgear in which the switchgear is loaded only sporadically, yields a device in which the energy necessary for an opening and/or closing operation may be stored in an onboard capacitor bank, the average power necessary to restore the energy after an operation being sufficiently low, given the rate of loading (use), for this energy to be transmitted optically from a light source situated on the ground, such as one or more semiconductor lasers or one or more high-power light-emitting diodes, and routed to the heart of the actuator of the invention via one or more optical fibers, preferably silica fibers, the conversion of light energy into electric energy being effected in known manner via one or more photovoltaic converters.

The two modular design features that have just been described, with which may be associated optical transmission of the energy required for an opening and/or closing operation, enable a permanent magnet electromagnetic actuator and the mechanical switch-disconnector of the invention to be used in the mechatronic circuit-breaker as described and claimed in the patent application filed the same day as the present application and entitled "Dispositif disjoncteur mécatronique et procéde de déclenchement associé et application à la coupure de courant continu élevé" ["A mechatronic circuit-breaker device, an associated triggering method, and an application to breaking high direct currents"].

Many improvements may be made without departing from the scope of the invention.

Thus where the materials are concerned, all the permanent magnets of the invention may be rare earth magnets such as neodymium-iron-boron magnets. They may equally be in an organic material.

Where the fastening of the permanent magnets to their substrates is concerned, there may simply be envisaged as shown direct gluing to the substrates and where necessary insertion in grooves in the substrates, these grooves essentially making it possible to facilitate the positioning of the magnets when assembling the stator part on which they are mounted. Care is of course taken that the fastening method modifies the magnetic field lines as little as possible.

Furthermore, where the shape of the permanent magnets is concerned, magnets of parallelepipedal general shape may be envisaged. For a rotary actuator of the invention, permanent magnets of trapezoidal shape along their length may also be envisaged, i.e. as seen in a front view of the stator parts. They may therefore be active conductive portions of the rotor parts, i.e. those carrying the current for producing Lorentz drive forces, which remain throughout the angular movement in front of the permanent magnets. In other words, throughout their angular movement, the active conductive portions (which extend radially) may remain as much as possible in the most active magnetic field areas. Magnets of trapezoidal section, i.e. in their thickness, or in other words in the direction of the thickness of the airgaps to be produced, may also be envisaged. Thus the magnetic flux density may be locally increased at their level.

Moreover, where the mechanical connections for transmitting mechanical forces between the rotor parts and the mechanical elements to be moved are concerned, they may advantageously consist in deformable parallelograms as shown in FIG. 9. Moreover, the links 74.1 or 74.2 may be rigid or deformable. When they are rigid they may be produced in plastics materials, preferably injection molded materials. The section of the links may be adapted as required: thus these links may be flat, cylindrical or asymmetrical.

The invention claimed is:
1. An electromagnetic actuator (A) of the permanent magnet type comprising:
 a first stator part (1) formed in a first substrate (10), at least part of which has rotational symmetry with at least one plane face forming a disk defining an axis of symmetry orthogonal to the disk, and comprising a first series of permanent magnets apparent on at least the disk of the first substrate and uniformly distributed over its surface with a constant angular pitch; each of the permanent magnets having a shape with at least one plane of symmetry orthogonal to its plane and parallel north and south poles parallel to the disk; the contact surfaces of the permanent magnets with the disk being inscribed between two concentric circles concentric with the disk; the plane of symmetry of each magnet being oriented along a radius of these concentric circles; two adjacent permanent magnets of the first series having opposite magnetization directions;
 a second stator part formed in a second substrate, at least part of which has rotational symmetry with at least one plane face forming a disk defining an axis of symmetry orthogonal to the disk, and comprising a second series of permanent magnets apparent on at least the disk of the second substrate and uniformly distributed over its surface with a constant angular pitch; each of the permanent magnets having a shape with at least one plane of symmetry orthogonal to its plane and parallel north and south poles parallel to the disk; the contact surfaces of the permanent magnets with the disk being inscribed between two concentric circles concentric with the disk; the plane of symmetry of each magnet being oriented along a radius of these concentric circles; two adjacent permanent magnets of the second series having opposite magnetization directions; the second stator part being disposed parallel to the first stator part so that the axes of symmetry of their disks coincide and so that one pole (S or N) of a magnet of the second series faces an opposite pole of a magnet of the first series so as to create intense magnetic fields in the airgap constituted in this way between the first and second stator parts;

at least one pair of superposed rotor parts in the airgaps between the first and second stator parts, each rotor part being formed from an electrically-insulative material substrate comprising at least one track (4) of at least one electrically-conductive material layer disposed in a plane parallel to the plane of the substrate, the track comprising radial track portions called drive track portions, of unit width less than or equal to that of the permanent magnets in the radial direction and perpendicular to the direction of the thickness of the airgaps between the first and second stator parts, the drive track portions being regularly spaced with the same angular pitch as the first and second series of permanent magnets, the number of drive track portions being equal to the number of magnets of the first and second stator parts;

in which actuator:
two adjacent drive track portions in the same plane in the same rotor part are adapted to be supplied with currents flowing in opposite directions;
two drive track portions respectively belonging to the first and second rotor parts of the same pair of rotor parts and superposed so as to be subjected to the magnetic field created by the same pair of magnets are also adapted to be simultaneously supplied with currents flowing in opposite directions so that when all the drive tracks are supplied with current the Lorentz drive forces generated by said currents in the magnetic fields created by the first and second series of permanent magnets, in the airgaps between the first and second stator parts, move one rotor part in the opposite direction to the other rotor part of the same pair along an axis perpendicular to the thickness of the airgaps.

2. A permanent magnet actuator according to claim 1, wherein the permanent magnets are stuck directly onto the substrates supporting them.

3. A permanent magnet actuator according to claim 2, wherein the permanent magnets are furthermore inserted into grooves produced in the substrates of the stator parts.

4. A permanent magnet actuator according to claim 1, wherein between two adjacent magnets of the same stator part is inserted a non-ferromagnetic material shield the thickness of which is sufficient to prevent mechanical contact between the exposed surfaces of the magnets and the rotor parts nearest them.

5. A permanent magnet actuator according to claim 4, wherein the shields are portions of a single mechanical part fastened to the stator part (10, 20) with which it is in contact.

6. A permanent magnet actuator according to claim 4, wherein the shields are in electrically-insulative material.

7. A permanent magnet actuator according to any one of claim 4, wherein the shields are produced from a fluoropolymer such as polytetrafluoroethylene (PTFE).

8. A permanent magnet actuator according claim 1, wherein each rotor part comprises a single track, the drive track radial portions being connected to each other by tangential portions forming crenellations when the rotor part is seen from the front.

9. A permanent magnet actuator according to claim 1, wherein a rotor part is produced by a multi-layer printed circuit, a track being constituted by an even number of superposed electrically-conductive material layers adapted to be supplied with currents flowing in the same direction.

10. A permanent magnet actuator according to claim 9, wherein the number of superposed electrically-conductive material layers is equal to four.

11. A permanent magnet actuator according to claim 1, wherein the substrate of a rotor part is pre-impregnated, the layer or layers of electrically-conductive material being in copper and being covered with an electrically-insulative material finishing layer.

12. A permanent magnet actuator according to claim 1, comprising at least two distinct pairs of superposed rotor parts in the airgaps between the first stator part and the second stator part.

13. A permanent magnet actuator according to claim 12, wherein two superposed rotor parts belonging to two distinct pairs are adapted to be moved in the same direction when all the tracks are supplied with current.

14. A permanent magnet actuator according to claim 12, wherein two superposed rotor parts belonging to two distinct pairs are adapted to be moved in opposite directions relative to each other when all the tracks are supplied with current.

15. A permanent magnet actuator according to claim 1, wherein all the tracks of the rotor parts are supplied electrically in series with the same current.

16. A permanent magnet actuator according to claim 15, wherein the electrical connection between rotor parts is effected by flexible conductive wires.

17. A permanent magnet actuator according to claim 1, wherein the substrates supporting the permanent magnets are in ferromagnetic material.

18. A permanent magnet actuator according to claim 1, wherein there is an even number of permanent magnets in a series of each stator part.

19. A set of actuators comprising at least two superposed permanent magnet actuators wherein each of the permanent magnet actuators comprises:
first stator part (1) formed in a first substrate (10), at least part of which has rotational symmetry with at least one plane face forming a disk defining an axis of symmetry orthogonal to the disk, and comprising a first series of permanent magnets (100, 110) apparent on at least the disk of the first substrate and uniformly distributed over its surface with a constant angular pitch; each of the permanent magnets having a shape with at least one plane of symmetry orthogonal to its plane and parallel north and south poles parallel to the disk; the contact surfaces of the permanent magnets with the disk being inscribed between two concentric circles concentric with the disk; the plane of symmetry of each magnet being oriented along a radius of these concentric circles; two adjacent permanent magnets of the first series having opposite magnetization directions (100, 110);
a second stator part (2) formed in a second substrate (20), at least part of which has rotational symmetry with at least one plane face forming a disk defining an axis of symmetry orthogonal to the disk, and comprising a second series of permanent magnets (200, 210) apparent on at least the disk of the second substrate and uniformly distributed over its surface with a constant angular pitch; each of the permanent magnets having a shape with at least one plane of symmetry orthogonal to its plane and parallel north and south poles parallel to the disk; the contact surfaces of the permanent magnets with the disk being inscribed between two concentric circles concentric with the disk; the plane of symmetry of each magnet being oriented along a radius of these concentric circles; two adjacent permanent magnets of the second series having opposite magnetization directions (210, 200); the second stator part being disposed parallel to the first stator part so that the axes of symmetry of their disks coincide and so that one pole (S or N) of a magnet of the second series (210, 200) faces an opposite pole of a magnet of the first series (100, 110 so as to create intense magnetic fields in the airgap constituted in this way between the first and second stator parts;

at least one pair of superposed rotor parts in the airgaps between the first and second stator parts, each rotor part being formed from an electrically-insulative material substrate comprising at least one track of at least one electrically-conductive material layer disposed in a plane parallel to the plane of the substrate, the track comprising radial track drive portions, of unit width less than or equal to that of the permanent magnets in the radial direction and perpendicular to the direction of the thickness of the airgaps between the first and second stator parts, the drive track portions being regularly spaced with the same angular pitch as the first and second series of permanent magnets, the number of drive track portions being equal to the number of magnets of the first and second stator parts;

in which actuator:

two adjacent drive track portions in the same plane in the same rotor part are adapted to be supplied with currents flowing in opposite directions;

two drive track portions respectively belonging to the first and second rotor parts of the same pair of rotor parts and superposed so as to be subjected to the magnetic field created by the same pair of magnets are also adapted to be simultaneously supplied with currents flowing in opposite directions so that when all the drive tracks are supplied with current the Lorentz drive forces generated by said currents in the magnetic fields created by the first and second series of permanent magnets, in the airgaps between the first and second stator parts, move one rotor part in the opposite direction to the other rotor part of the same pair along an axis perpendicular to the thickness of the airgaps, so that when all the drive tracks are supplied with current the Lorentz drive forces generated by said currents in the magnetic fields created by the first and second series of permanent magnets, in the airgaps between the first and second stator parts, move one rotor part in the opposite direction to the other rotor part of the same pair along an axis perpendicular to the thickness of the airgaps, and wherein the second stator part of one of the two actuators also constitutes the first stator part of the other of the two actuators, called the intermediate stator part, said intermediate stator part comprising the same series of permanent magnets with each pole apparent on one face of the same substrate.

20. A set of actuators according to claim 19, wherein all the tracks of the rotor parts are supplied electrically in series with the same current I.

21. A set of actuators according to claim 19, wherein the electrical connection between rotor parts is effected by flexible conductive wires (5).

22. A set of actuators according to claim 19, wherein all the rotor parts of the two actuators are adapted to be moved in the same rotation direction and are mechanically connected at their periphery by rigid flanges each constituting a connecting flange.

23. A set of actuators according to claim 22, wherein two adjacent rigid flanges are connected to rotor disks adapted to be moved in opposite rotation directions relative to each other, each of the two flanges being mechanically connected to at least one link, each of the two links being mechanically connected to the same mechanical element, so that movement in rotation of the rotor disks in opposite directions generates movement in translation of the mechanical element.

24. A set of actuators according to claim 23, wherein each of the two adjacent flanges is mechanically connected to two links, themselves mechanically connected each to a distinct mechanical element so that movement in rotation of the rotor disks in opposite radial directions generates movement in translation of the two distinct mechanical elements in opposite translation directions relative to each other.

25. A set of actuators according to claim 23, wherein a mechanical element is secured to a movable contact of a vacuum interrupter.

\* \* \* \* \*